United States Patent
Izumino et al.

(10) Patent No.: US 8,491,398 B2
(45) Date of Patent: Jul. 23, 2013

(54) TRIPOD TYPE CONSTANT-VELOCITY UNIVERSAL JOINT AND METHOD FOR PRODUCING THE SAME

(75) Inventors: Junichi Izumino, Iwata (JP); Kenji Konaka, Iwata (JP); Hiroshi Murakami, Iwata (JP); Akira Sera, Iwata (JP); Jiahua Miao, Iwata (JP); Shunsuke Makino, Iwata (JP)

(73) Assignee: NTN Corporation, Osaka (JP)

( * ) Notice: Subject to any disclaimer, the term of this patent is extended or adjusted under 35 U.S.C. 154(b) by 35 days.

(21) Appl. No.: 13/259,504

(22) PCT Filed: Apr. 2, 2010

(86) PCT No.: PCT/JP2010/056070
§ 371 (c)(1),
(2), (4) Date: Sep. 23, 2011

(87) PCT Pub. No.: WO2010/122893
PCT Pub. Date: Oct. 28, 2010

(65) Prior Publication Data
US 2012/0021842 A1    Jan. 26, 2012

(30) Foreign Application Priority Data
Apr. 20, 2009   (JP) ................................. 2009-102144

(51) Int. Cl.
*F16D 3/205*   (2006.01)
(52) U.S. Cl.
USPC .......................... 464/111; 29/DIG. 18; 72/352
(58) Field of Classification Search
USPC ............ 464/111, 123, 124, 905; 29/898.063, 29/888.066, DIG. 10, DIG. 18; 72/352
See application file for complete search history.

(56) References Cited

U.S. PATENT DOCUMENTS

| | | | |
|---|---|---|---|
| 3,930,378 A * | 1/1976 | Schmid | 464/111 |
| 4,747,803 A | 5/1988 | Kimata et al. | |
| 6,475,092 B1 | 11/2002 | Kura et al. | |
| 2007/0149296 A1 | 6/2007 | Yoon | |

FOREIGN PATENT DOCUMENTS

| | | | |
|---|---|---|---|
| DE | 10 2008 020 342 | 10/2009 | |
| GB | 2 268 789 A * | 1/1994 | 464/111 |
| JP | 62-4624 | 1/1987 | |
| JP | 62-20225 | 2/1987 | |
| JP | 62-49022 | 3/1987 | |
| JP | 04-135032 | 5/1992 | |
| JP | 2000-81050 | 3/2000 | |
| JP | 2000-320563 | 11/2000 | |

(Continued)

OTHER PUBLICATIONS

International Search Report issued Apr. 27, 2010 in International (PCT) Application No. PCT/JP2010/056070.

(Continued)

*Primary Examiner* — Gregory Binda
(74) *Attorney, Agent, or Firm* — Wenderoth, Lind & Ponack, L.L.P.

(57) ABSTRACT

A manufacturing method for a tripod type constant velocity universal joint includes, when forging a raw-shaped material corresponding to each of three journals into a journal shape using a molding surface of a die and in a state where a relief portion is provided on a raw-shaped-material-leading-end-side of the die, molding an outer peripheral surface of the raw-shaped material into a projected round shape. The molding occurring with a tapered surface formed on the molding surface with which the outer peripheral surface of the raw-shaped material is held in contact and a recessed round surface formed between the molding surface and the tapered surface.

19 Claims, 9 Drawing Sheets

FOREIGN PATENT DOCUMENTS

| | | |
|---|---|---|
| JP | 2002-266888 | 9/2002 |
| JP | 2007-177994 | 7/2007 |
| JP | 2008-025800 | 2/2008 |
| JP | 2010-53967 | 3/2010 |
| WO | 00/14419 | 3/2000 |
| WO | 2010/024083 | 3/2010 |

OTHER PUBLICATIONS

International Preliminary Report on Patentability and Written Opinion of the International Searching Authority issued Dec. 1, 2011 in International (PCT) Application No. PCT/JP2010/056070.

* cited by examiner

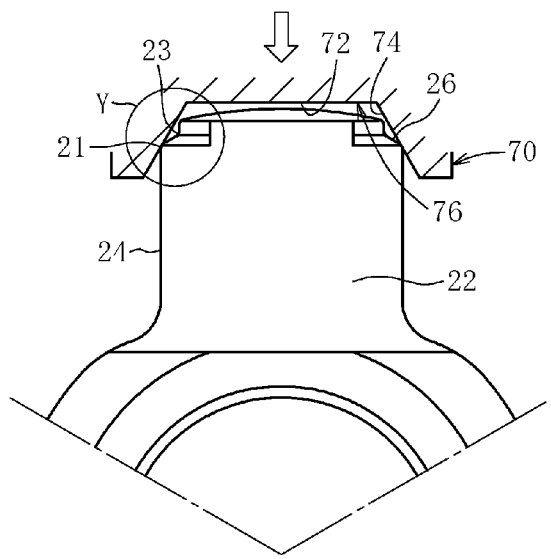
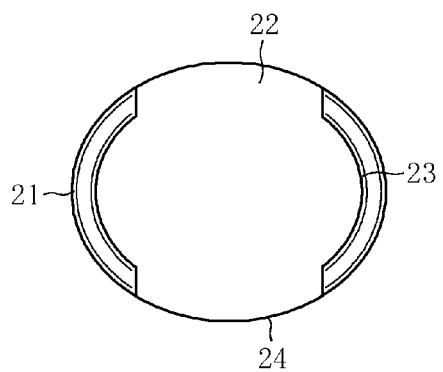
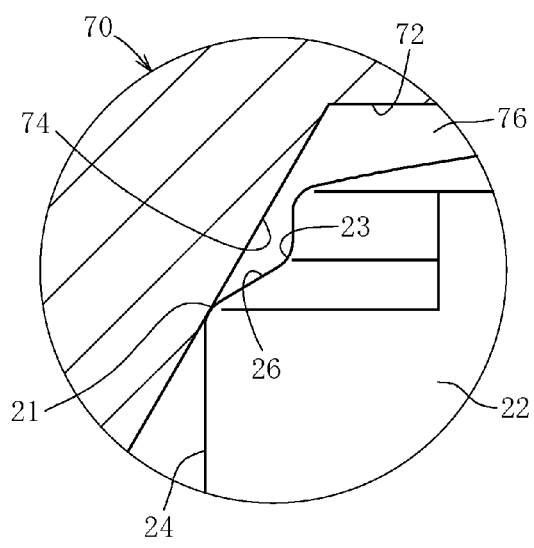

TRIPOD TYPE CONSTANT-VELOCITY UNIVERSAL JOINT AND METHOD FOR PRODUCING THE SAME

TECHNICAL FIELD

The present invention relates to a tripod type constant velocity universal joint and a manufacturing method for the same. The tripod type constant velocity universal joint being one of a plunging type constant velocity universal joint which is used in, for example, power transmission systems for automobiles, aircrafts, ships, various industrial machines, and the like, in particular, incorporated in a drive shaft, a propeller shaft, and the like used in, for example, FR vehicles and 4WD vehicles, and which allows axial displacement and angular displacement between two shafts on a driving side and a driven side.

BACKGROUND ART

For example, as a constant velocity universal joint used as means for transmitting a rotational force at a constant velocity from an engine of an automobile to wheels, there is a tripod type constant velocity universal joint. The tripod type constant velocity universal joint has a structure capable of coupling the two shafts on the driving side and the driven side to each other, transmitting rotational torque at a constant velocity even when each of the two shafts forms an operating angle, and allowing relative displacement in an axial direction.

As the tripod type constant velocity universal joint of this type, there have been well-known one of a single-roller type in which one roller is provided as a torque transmitting member, and one of a double-roller type in which two rollers are provided so that vibration at the time of operation can be reduced. FIGS. 9 to 11 exemplify a tripod type constant velocity universal joint of the double-roller type (for example, refer to Patent Literature 1).

The tripod type constant velocity universal joint includes, as illustrated in FIGS. 9 and 10, a main portion formed of an outer joint member 110, a tripod member 120, and roller units 130 as torque transmitting members. One of the two shafts on the driving side and the driven side is coupled to the outer joint member 110, and another of the two shafts is coupled to the tripod member 120.

The outer joint member 110 is formed into a cup-like shape open at one end, and has an inner peripheral surface equiangularly provided with three linear track grooves 112 extending in an axial direction and roller-guide surfaces 114 extending in the axial direction on both sides of each of the track grooves 112. The outer joint member 110 incorporates the tripod member 120 and the roller units 130. The tripod member 120 includes three journals 122 each projected into a radial direction, and a shaft 140 is press-fitted into a center hole 128 of the tripod member 120 and spline-fitted thereto. An annular snap ring 142 prevents the shaft 140 from dropping off from the center hole 128 of the tripod member 120.

Further, each of the roller units 130 includes a main portion formed of an outer roller 132, an inner roller 134 arranged on an inside of the outer roller 132 and externally fitted to corresponding one of the journals 122, and needle rollers 136 interposed between the outer roller 132 and the inner roller 134. The roller units 130 are accommodated in the track grooves 112 of the outer joint member 110. Note that, an inner peripheral surface of the inner roller 134 has a convex circular-arc shape. As illustrated in FIGS. 9 and 10, ring-like washers 135 and 137 prevent the needle rollers 136 from being detached from each of the roller units 130 onto a shaft side or an inner surface side of the outer joint member 110.

Meanwhile, each of the journals 122 of the tripod member 120 has a straight shape orthogonal to an axial line of the joint in vertical cross-section with respect to an axial line of each of the journals 122. Further, as illustrated in FIG. 11, each of the journals 122 has a substantially elliptical shape of being held in contact with the inner roller 134 in a direction orthogonal to the axial line of the joint in lateral cross-section with respect to the axial line of each of the journals 122, and gaps m are formed between each of the journals 122 and the inner roller 134 in an axial-line direction of the joint. The roller units 130 are supported rotatably around the journals 122 each having such a shape.

In this constant velocity universal joint, the journals 122 of the tripod member 120 and the roller-guide surfaces 114 of the outer joint member 110 are engaged with each other into rotational directions of the two shafts through intermediation of the roller units 130. In this way, rotational torque is transmitted at a constant velocity from the driving side to the driven side. Further, when the roller units 130 roll on the roller-guide surfaces 114 while being rotated with respect to the journals 122, relative axial displacement and angular displacement between the outer joint member 110 and the tripod member 120 are cancelled.

In this case, the journals 122 are tiltable with respect to the roller units 130 rolling on the roller-guide surfaces 114. Thus, an attempt is made to avoid a state in which the roller units 130 and the roller-guide surfaces 114 are diagonal with respect to each other in accordance with the tilting of the journals 122 so that induced thrust and sliding resistance are reduced.

Citation List

Patent Literature

[PTL 1] JP 2000-320563 A

SUMMARY OF INVENTION

Technical Problem

By the way, in manufacture of the above-mentioned conventional tripod type constant velocity universal joint, after the journals 122 of the tripod member 120 are molded by forging, centering of the journals 122 is performed. In other words, as illustrated in FIG. 12, a raw-shaped material 152 corresponding to each of the journals 122 is forged into a journal shape through plastic flow while being held with a die 160.

In the forging, the entire of a leading end portion of the raw-shaped material 152 is held with the die 160, and hence it is difficult to fill an inner-wall corner portion 162 of the die 160 with the raw-shaped material 152. Thus, a gap P is formed between a leading-end corner portion 152a of the raw-shaped material 152 and an inner-wall corner portion 162 of the die 160. In this way, the journal 122 is molded under a state in which the leading-end corner portion 152a of the raw-shaped material 152 is not held with the die 160 at the time of forging. Thus, a leading-end corner portion 122a of the journal 122 is formed into a gentle curved-surface shape as illustrated by the broken lines in FIG. 13.

Meanwhile, in a centering step for the molded journal 122 after forging, at the leading-end corner portion 122a of the journal 122, it is necessary to form an edge portion as a centering reference, which is brought into contact with a centering jig so as to perform centering. However, with respect to the journal 122 including the curved-surface-shaped leading-end corner portion 122a formed under the state of not being held with the die 160 at the time of forging, it is difficult to perform centering by bringing the centering jig into contact with the leading-end corner portion 122a.

Note that, it may be possible to eliminate, at the time of forging of the raw-shaped material 152, the gap p formed between the inner-wall corner portion 162 of the die 160 and the leading-end corner portion 152a of the raw-shaped material 152. However, in order to eliminate the gap p, it is necessary to strictly regulate forging conditions such as a size of the raw-shaped material 152 and a setting condition of a forging machine. Thus, a forging process becomes more difficult.

Under the circumstance, after forging, a leading end portion of the journal 122 (broken-line part illustrated in FIG. 13) is removed by lathing so that an edge portion 122b as the centering reference is formed at the leading-end corner portion. Note that, when burrs are left around the edge portion 122b even after the lathing process, the burrs are removed by appropriate means such as tumbling or shot-blasting.

In the centering step for the journal 122, as illustrated in FIG. 14, the edge portion 122b of the journal 122 is brought into contact with a tapered surface 174 formed around a recessed portion 176 of a centering jig 170 and expanding from a top surface 172 into the axial direction of the journal 122. In this state, a pressurizing force is applied to the centering jig 170 from a direction indicated by a hollow arrow D in FIG. 14. In this way, an axial center a of the journal 122 is corrected to be orthogonal to an axial line O of the joint in the radial direction. Thus, centering of the journal 122 can be performed.

However, as for the above-mentioned conventional tripod type constant velocity universal joint, after the molding by forging, the leading end portion of the journal 122 is required to be removed by lathing for the purpose of forming the centering reference. Thus, it is necessary to perform the lathing step and to form the raw-shaped material 152 to be large in advance in consideration of a lathing amount, which leads to a problem of an increase in weight of the raw-shaped material 152. Further, when burrs are left around the edge portion 122b even after the lathing process, it is also necessary to perform a step of removing the burrs. In this way, man hours increase owing to the lathing step and the burr removing step, which leads to an increase in product cost.

The present invention has been made in view of the above-mentioned problems, and it is therefore an object of the present invention to provide a tripod type constant velocity universal joint and a manufacturing method for the same which contribute to reduction of manufacturing man hours and also to facilitation of the forging process on the journals without involving the increase in weight of the raw-shaped material.

Solution to Problems

As a technical measure for achieving the above-mentioned object, the present invention provides a tripod type constant velocity universal joint including: an outer joint member having an inner peripheral surface provided with: three track grooves extending in an axial direction; and roller-guide surfaces extending in the axial direction on both sides of each of the three track grooves; a tripod member including three journals each projected into a radial direction; and a torque transmitting member supported rotatably around each of the three journals of the tripod member and inserted rollably in each of the three track grooves of the outer joint member, and further provides a manufacturing method for the tripod type constant velocity universal joint. The tripod type constant velocity universal joint and the manufacturing method therefor have the following characteristics.

First, the manufacturing method for a tripod type constant velocity universal joint according to the present invention includes, when forging a raw-shaped material corresponding to each of the three journals into a journal shape with use of a molding surface of a die, under a state in which a relief portion is provided on a raw-shaped-material-leading-end-side of the die, molding an outer peripheral surface of the raw-shaped material into a projected round shape with use of a narrowing surface formed on the molding surface with which the outer peripheral surface of the raw-shaped material is held in contact and a recessed round surface formed between the molding surface and the narrowing surface. Further, in the tripod type constant velocity universal joint according to the present invention, on an outer peripheral surface of each of the three journals, a projected round-corner portion for reducing a lateral sectional area toward a leading end side of each of the three journals is formed.

In the present invention, when the raw-shaped material corresponding to each of the three journals is forged into the journal shape with use of the molding surface of the die, the relief portion provided on a leading end side of each of the three journals enables plastic flow of the raw-shaped material to be smoothly performed and the raw-shaped material to be reliably held in close contact with the molding surface of the die, the narrowing surface formed on a leading end side of the molding surface, and the recessed round surface formed between the molding surface and the narrowing surface. As a result, the outer peripheral surface of the raw-shaped material is molded in conformity with the molding surface, the recessed round surface, and the narrowing surface of the die, that is, into the projected round shape. In this way, there is obtained a tripod member including journals each having an outer peripheral surface provided with a projected round-corner portion for reducing a lateral sectional area toward the leading end side.

In this way, the projected round-corner portion formed on the outer peripheral surface of each of the journals can be used as it is as an edge portion as the centering reference in centering after forging. As a result, it is unnecessary to perform conventional lathing and burr removal after forging or to increase a weight of the raw-shaped material in consideration of a lathing amount, and possible to reduce manufacturing man hours. Further, also in the forging step, it is unnecessary to strictly regulate the forging conditions such as the size of the raw-shaped material and the setting condition of the forging machine. Thus, the forging process can be easily performed.

In addition, a part of the die, which molds the projected round-corner portion to be used as the edge portion as the centering reference, in other words, a part between the molding surface and the narrowing surface of the die is formed as the recessed round surface. Thus, in comparison with a case where the part between the molding surface and the narrowing surface is formed at a right angle, at the time of forging, early abrasion of the die owing to plastic flow of the raw-shaped material at this part can be suppressed. As a result, a life of the die can be prolonged.

In the manufacturing method for a tripod type constant velocity universal joint according to the present invention, it is desired that the molding surface of the die be a surface parallel to an axial direction of each of the three journals, and the narrowing surface of the die be a tapered surface inclined with respect to the axial direction of each of the three journals. Further, it is desired that, on the outer peripheral surface of each of the three journals in the tripod type constant velocity universal joint according to the present invention, a tapered surface inclined with respect to an axial direction of each of the three journals be formed on a leading end side relative to the projected round-corner portion. With this, at the time of forging, plastic flow of the raw-shaped material can be smoothly performed, with the result that the raw-shaped material is more easily held in close contact with the tapered surface.

In the manufacturing method for a tripod type constant velocity universal joint according to the present invention, the recessed round surface is only required to be provided at one point in a circumferential direction of the molding surface of the die. Further, it is desired that the projected round-corner portion in the tripod type constant velocity universal joint according to the present invention is provided at one point in a circumferential direction of the outer peripheral surface of each of the three journals. With this, at the time of centering of each of the three journals, when the projected round-corner portion formed with use of the recessed round surface of the die is brought into contact with a centering jig, centering is performed only at the one point in the circumferential direction of the outer peripheral surface of each of the three journals. Thus, centering can be easily performed.

In the manufacturing method for a tripod type constant velocity universal joint according to the present invention, it is desired that two recessed round surfaces are provided at two points facing each other in a circumferential direction of the molding surface of the die. Further, it is desired that two projected round-corner portions in the tripod type constant velocity universal joint according to the present invention are provided at two points facing each other in the circumferential direction of the outer peripheral surface of each of the three journals. With this, at the time of centering of each of the three journals, when the two projected round-corner portions formed with use of the two recessed round surfaces of the die are brought into contact with a centering jig, centering is performed at the two points in the circumferential direction of the outer peripheral surface of each of the three journals. Thus, centering can be performed with higher accuracy.

The manufacturing method for a tripod type constant velocity universal joint according to the present invention is desired to further include molding a leading end side of the projected round-corner portion of the raw-shaped material into a recessed round-corner portion with use of a projected round surface formed between the narrowing surface and a relief surface of the relief portion. Further, it is desired that, on the outer peripheral surface of each of the three journals in the tripod type constant velocity universal joint according to the present invention, a recessed round-corner portion be formed on the leading end side relative to the projected round-corner portion. With this, in comparison with a case where the part between the narrowing surface and the relief surface of the relief portion of the die is formed at a right angle, at the time of forging, early abrasion of the die owing to plastic flow of the raw-shaped material at this part can be suppressed. As a result, the life of the die can be prolonged.

Note that, the present invention is desired to be applied to a tripod type constant velocity universal joint, in which: the torque transmitting member includes: an outer roller inserted in corresponding one of the three track grooves of the outer joint member; and an inner roller externally fitted to corresponding one of the three journals and arranged on an inner peripheral side of the outer roller; an inner peripheral surface of the inner roller has a convex circular-arc shape; each of the three journals has a straight shape orthogonal to an axial line of the tripod type constant velocity universal joint in vertical cross-section, and is held in contact with the inner peripheral surface of the inner roller in a direction orthogonal to the axial line of the tripod type constant velocity universal joint in lateral cross-section; and a gap is formed between each of the three journals and the inner peripheral surface of the inner roller in an axial-line direction of the tripod type constant velocity universal joint. That is, the present invention is desired to be applied to a tripod type constant velocity universal joint of what is called a double-roller type. Note that, in addition to the double-roller type, the present invention is applicable also to tripod type constant velocity universal joints of other types such as a single roller type.

In the manufacturing method for a tripod type constant velocity universal joint according to the present invention, it is desired that a lateral cross-section of the molding surface of the die have a substantially elliptical shape, and the recessed round surface be arranged on an elliptical longitudinal side. Further, it is desired that a lateral cross-section of each of the three journals in the tripod type constant velocity universal joint according to the present invention have a substantially elliptical shape, and the projected round-corner portion of each of the three journals be arranged on an elliptical longitudinal side. With this, at the time of centering of each of the three journals, when the projected round-corner portion arranged on the elliptical longitudinal side is brought into contact with the centering jig, a contact state of the centering jig with respect to each of the three journals can be stabilized. As a result, centering can be performed with higher accuracy.

Advantageous Effects of Invention

In the present invention, when the raw-shaped material corresponding to each of the three journals is forged into the journal shape with use of the molding surface of the die, the relief portion provided on the leading end side of each of the three journals enables plastic flow of the raw-shaped material to be smoothly performed and the raw-shaped material to be reliably held in close contact with the molding surface of the die, the narrowing surface formed on the leading end side of the molding surface, and the recessed round surface formed between the molding surface and the narrowing surface. As a result, the outer peripheral surface of the raw-shaped material is molded in conformity with the molding surface, the recessed round surface, and the narrowing surface of the die, that is, into the projected round shape. In this way, there is obtained a tripod member including journals each having an outer peripheral surface provided with the projected round-corner portion for reducing a lateral sectional area toward the leading end side.

In this way, the projected round-corner portion formed on the outer peripheral surface of each of the journals can be used as it is as the edge portion as the centering reference in centering after forging. As a result, it is unnecessary to perform conventional lathing and burr removal after forging or to increase a weight of the raw-shaped material in consideration of a lathing amount, and possible to reduce manufacturing man hours. Further, also in the forging step, it is unnecessary to strictly regulate the forging conditions such as the size of the raw-shaped material and the setting condition of the forging machine. Thus, the forging process can be easily performed.

In addition, the part of the die, which molds the projected round-corner portion to be used as the edge portion as the centering reference, in other words, the part between the molding surface and the narrowing surface of the die is formed as the recessed round surface. Thus, in comparison with a case where the part between the molding surface and the narrowing surface is formed at a right angle, at the time of forging, early abrasion of the die owing to plastic flow of the raw-shaped material at this part can be suppressed. As a result, the life of the die can be prolonged.

BRIEF DESCRIPTION OF DRAWINGS

FIG. 2A A sectional view of a centering jig under a state of being held in contact with the journal, illustrating a centering step for the journal according to the embodiment of the present invention.

FIG. 2B An enlarged view of the portion Y of FIG. 2A, illustrating the centering step for the journal according to the embodiment of the present invention.

FIG. 2C A plan view in which the journal of FIG. 2A is viewed from above, illustrating the centering step for the journal according to the embodiment of the present invention.

DETAILED DESCRIPTION OF THE INVENTION

Detailed description is made of embodiments of the present invention below. Note that, each of the embodiments below exemplifies a tripod type constant velocity universal joint of a double-roller type, which is capable of reducing vibration at the time of operation. In addition to the double-roller type, the present invention is applicable also to tripod type constant velocity universal joints of other types such as a single roller type.

Figure 5:
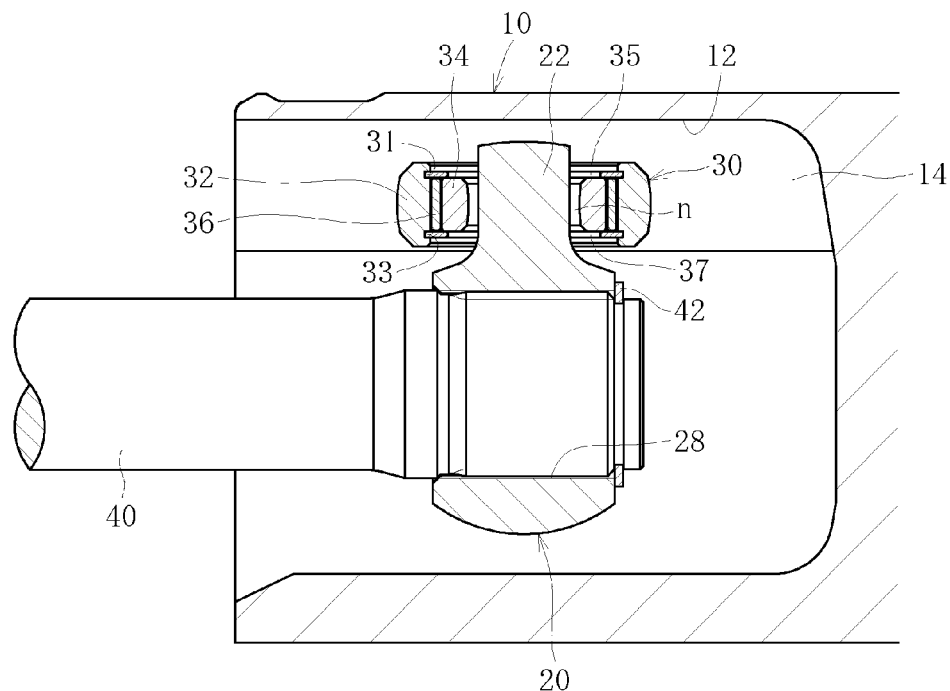
FIG. 5 A vertical sectional view illustrating the entire structure of a tripod type constant velocity universal joint according to the embodiments of the present invention.
Figure 6:
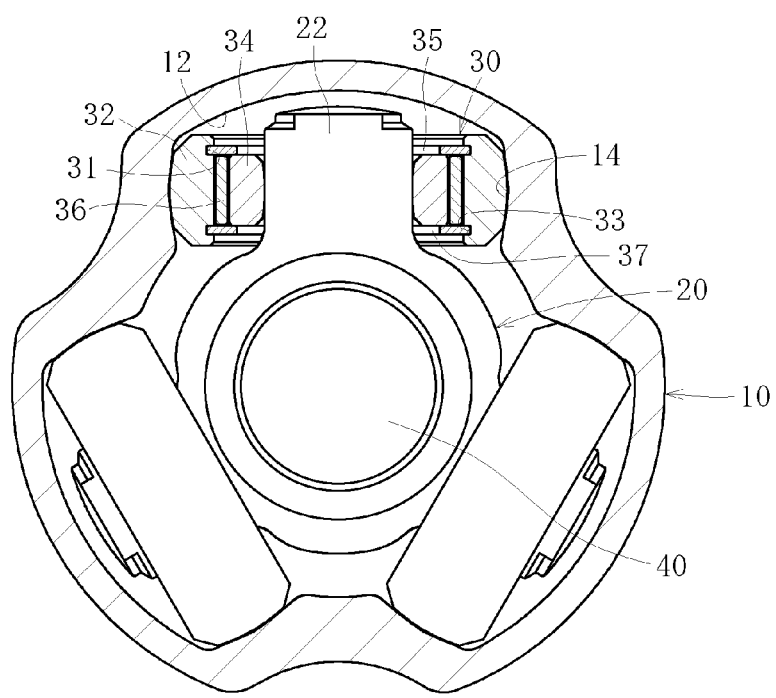
FIG. 6 A lateral sectional view of FIG. 5.

A tripod type constant velocity universal joint according to an embodiment illustrated in FIGS. 5 and 6 includes a main portion formed of an outer joint member 10, a tripod member 20, and roller units 30 as torque transmitting members. One of two shafts on a driving side and a driven side is coupled to the outer joint member 10, and another of the two shafts is coupled to the tripod member 20.

The outer joint member 10 is formed into a cup-like shape open at one end, and has an inner peripheral surface equiangularly provided with three linear track grooves 12 extending in an axial direction and roller-guide surfaces 14 extending in the axial direction on both sides of each of the track grooves 12. The outer joint member 10 incorporates the tripod member 20 and the roller units 30. The tripod member 20 includes three journals 22 each projected into a radial direction, and a shaft 40 is press-fitted into a center hole 28 of the tripod member 20 and spline-fitted thereto. An annular snap ring 42 prevents the shaft 40 from dropping off with respect to the tripod member 20.

Further, each of the roller units 30 includes a main portion formed of an outer roller 32, an inner roller 34 arranged on an inside of the outer roller 32 and externally fitted to corresponding one of the journals 22, and needle rollers 36 interposed between the outer roller 32 and the inner roller 34. The roller units 30 are accommodated in the track grooves 12 of the outer joint member 10. Note that, an inner peripheral surface of the inner roller 34 has a convex circular-arc shape. A plurality of needle rollers 36 are arranged between the inner roller 34 and the outer roller 32 under what is called a single-row full roller state free from a cage. The inner roller 34 and the needle rollers 36 are retained by ring-like washers 35 and 37 with respect to the outer roller 32, the washers 35 and 37 being fitted respectively to annular recessed grooves 31 and 33 formed in an inner peripheral surface of the outer roller 32.

Figure 7:
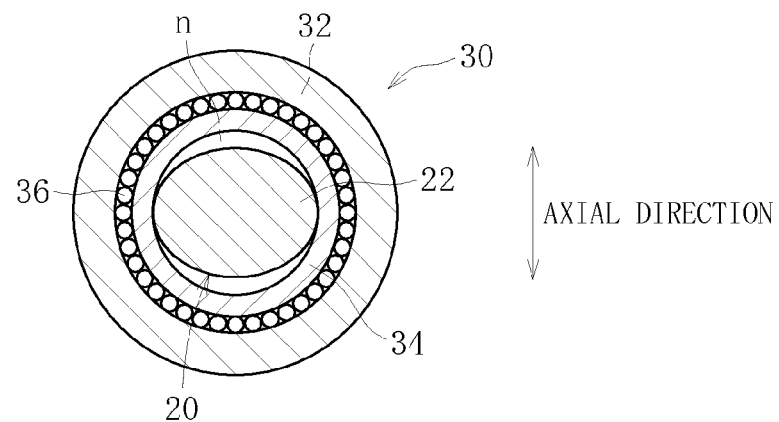
FIG. 7 A sectional view of the journal and the roller unit illustrated in FIGS. 5 and 6.

Meanwhile, each of the journals 22 of the tripod member 20 has a straight shape orthogonal to an axial line of the joint in vertical cross-section with respect to an axial line of each of the journals 22. Further, as illustrated in FIG. 7, each of the journals 22 has an elliptical shape of being held in contact with the inner roller 34 in a direction orthogonal to the axial line of the joint in lateral cross-section with respect to the axial line of each of the journals 22, and gaps n are formed between each of the journals 22 and the inner roller 34 in an axial-line direction of the joint. The roller units 30 are supported rotatably around the journals 22 each having such a shape.

In this constant velocity universal joint, the journals 22 of the tripod member 20 and the roller-guide surfaces 14 of the outer joint member 10 are engaged with each other into rotational directions of the two shafts through intermediation of the roller units 30. In this way, rotational torque is transmitted at a constant velocity from the driving side to the driven side.

Further, when the roller units 30 roll on the roller-guide surfaces 14 while being rotated with respect to the journals 22, relative axial displacement and angular displacement between the outer joint member 10 and the tripod member 20 are cancelled.

Figure 8:
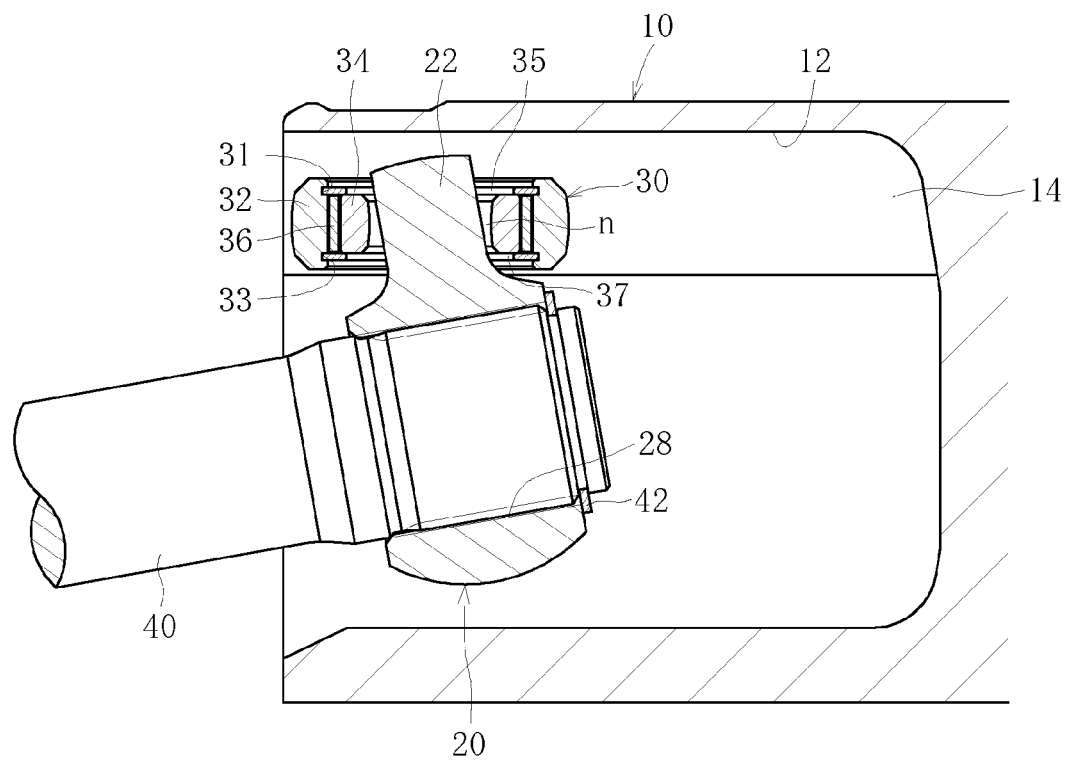
FIG. 8 A vertical sectional view illustrating a state in which the tripod type constant velocity universal joint of FIG. 5 forms an operating angle.
Figure 9:
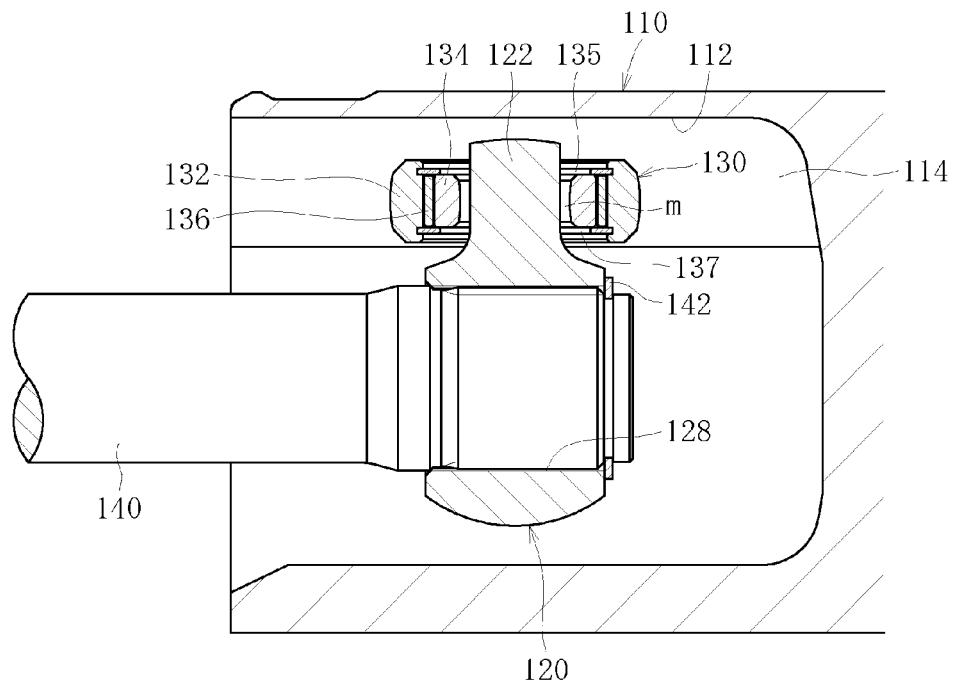
FIG. 9 A vertical sectional view illustrating the entire structure of a conventional tripod type constant velocity universal joint.
Figure 10:
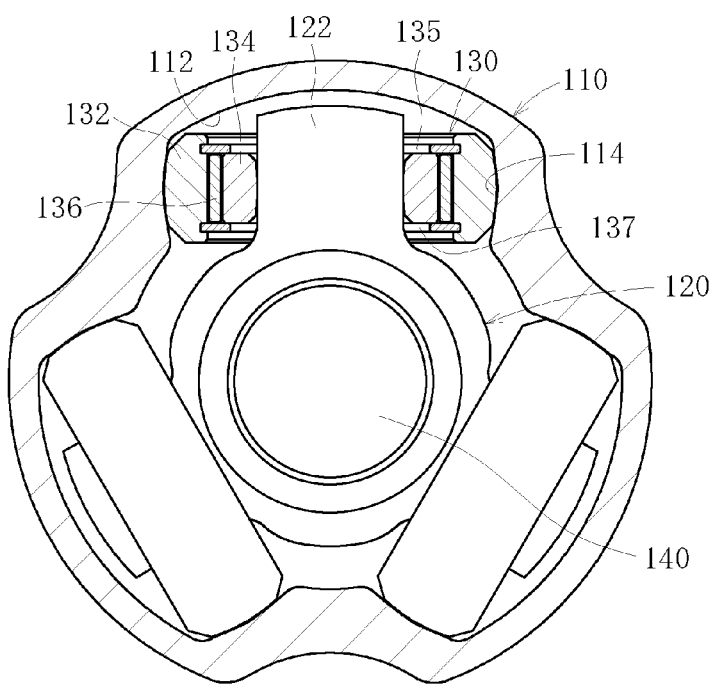
FIG. 10 A lateral sectional view of FIG. 9.
Figure 11:
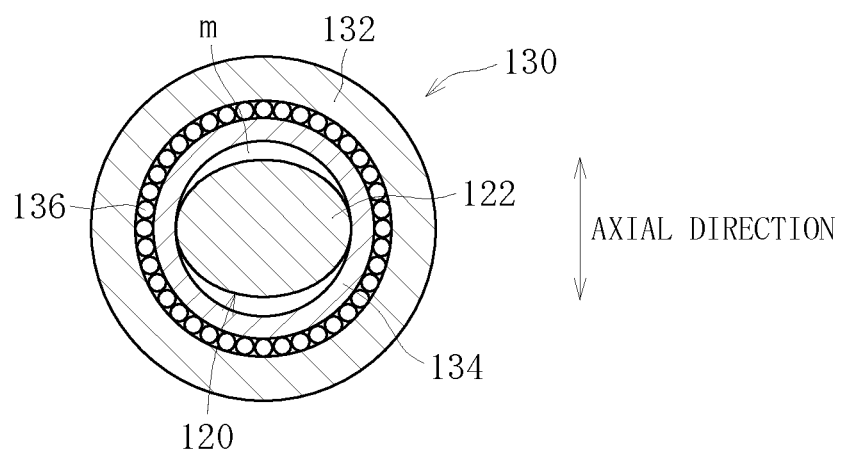
FIG. 11 A lateral sectional view of the roller unit illustrated in FIG. 10.

In this case, the gaps n are formed between each of the journals 22 and the inner roller 34 in the axial-line direction of the joint, and the journals 22 are tiltable with respect to the roller units 30 rolling on the roller-guide surfaces 14. Therefore, even when the joint forms an operating angle, as illustrated in FIG. 8, the roller unit 30 does not tilt with respect to the roller-guide surfaces 14. Thus, an attempt is made to avoid a state in which the roller units 30 and the roller-guide surfaces 14 are diagonal with respect to each other in accordance with the tilting of the journals 22 so that induced thrust and sliding resistance are reduced.

The tripod member 20 in the constant velocity universal joint according to this embodiment is manufactured by performing centering of the journals 22 after the journals 22 are molded by forging. In other words, as illustrated in FIG. 1A, the tripod member 20 is forged into a journal shape through plastic flow, with an outer peripheral surface 54 of a raw-shaped material 52 of the journal 22, which corresponds to a part of a raw-shaped material of the tripod member 20, being held with a die 60.

Figure 1A:
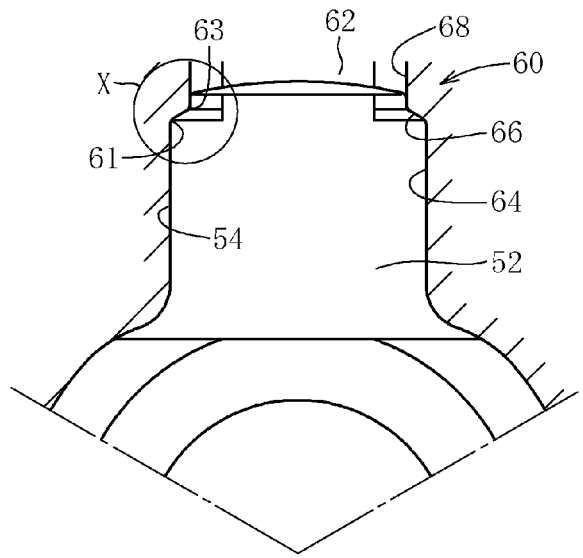
FIG. 1A A sectional view of a die under a state of holding a raw-shaped material, illustrating a forging step for a journal according to an embodiment of the present invention.
Figure 1C:
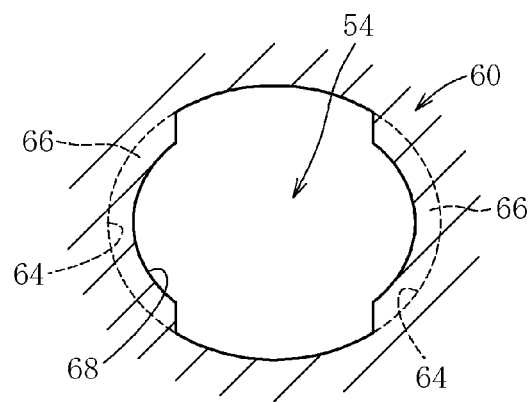
FIG. 1C A sectional view in which the die of FIG. 1A is viewed from above, illustrating the forging step for the journal according to the embodiment of the present invention.
Figure 1B:
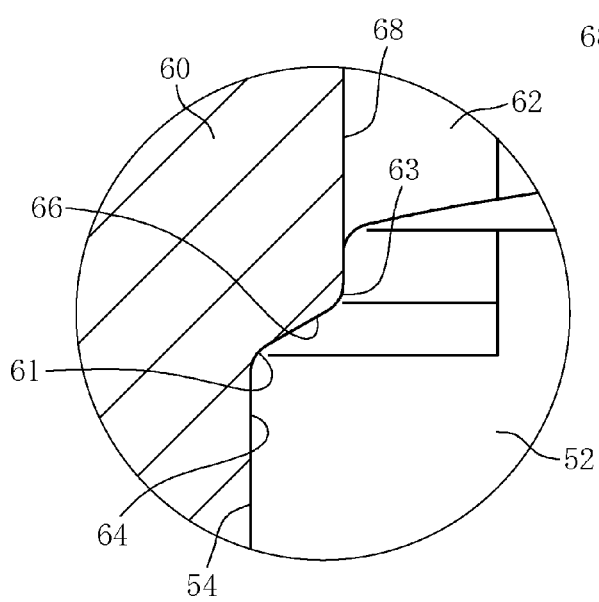
FIG. 1B An enlarged view of the portion X of FIG. 1A, illustrating the forging step for the journal according to the embodiment of the present invention.

The die 60 for holding the outer peripheral surface 54 of the raw-shaped material 52 of the journal 22 is provided with, as illustrated in FIGS. 1A and 1B, a relief portion 62 formed on a leading end side of the raw-shaped material 52, and has a molding surface 64 parallel to an axial direction of the journal 22, tapered surfaces 66 as narrowing surfaces formed on a leading end side of the molding surface 64 and inclined with respect to the axial direction of the journal 22, and relief surfaces 68 of the relief portion 62 formed on a leading end side of the tapered surfaces 66 and parallel to the axial direction of the journal 22. In addition, recessed round surfaces 61 are formed between the molding surface 64 and the tapered surfaces 66, and projected round surfaces 63 are formed between the tapered surfaces 66 and the relief surfaces 68. The recessed round surfaces 61, the tapered surfaces 66, and the projected round surfaces 63 are formed at two points facing each other in a circumferential direction of the molding surface 64 of the die 60 as illustrated in FIG. 1C, in other words, two points on an elliptical longitudinal side to be held in contact with an inner peripheral surface of the inner roller 34 after molding.

At the time of forging the journal 22, the relief portion 62 provided on a leading end side of the journal 22 enables plastic flow of the raw-shaped material 52 to be smoothly performed and the raw-shaped material 52 to be reliably held in close contact with the molding surface 64, the recessed round surfaces 61, the tapered surfaces 66, the projected round surfaces 63, and the relief surfaces 68 of the die 60. As a result, the outer peripheral surface 54 of the raw-shaped material 52 is molded in conformity with the molding surface 64, the recessed round surfaces 61, the tapered surfaces 66, the projected round surfaces 63, and the relief surfaces 68 of the die 60.

Figure 12:
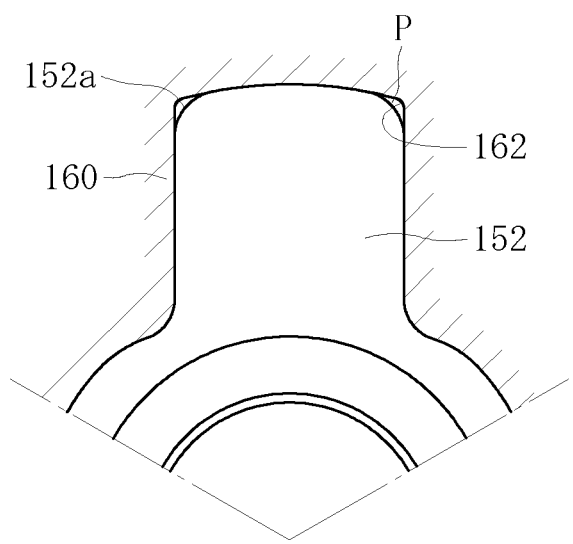
FIG. 12 A sectional view of a die under a state of holding a raw-shaped material, illustrating a forging step for a journal in a manufacturing method for the conventional tripod type constant velocity universal joint.
Figure 13:
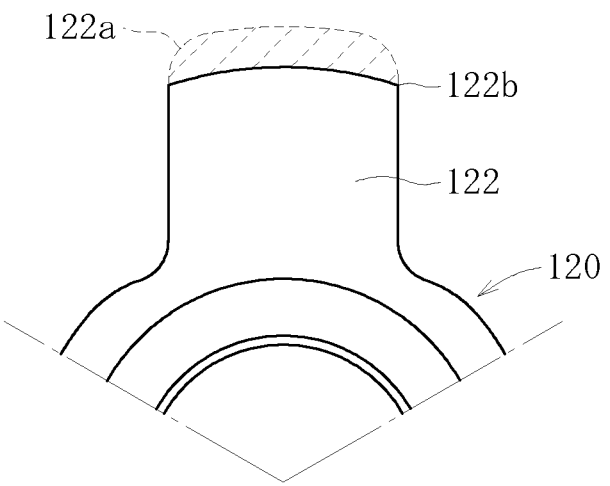
FIG. 13 A partial front view of the journal of a tripod member, illustrating a lathing step for the journal in the manufacturing method for the conventional tripod type constant velocity universal joint.
Figure 14:
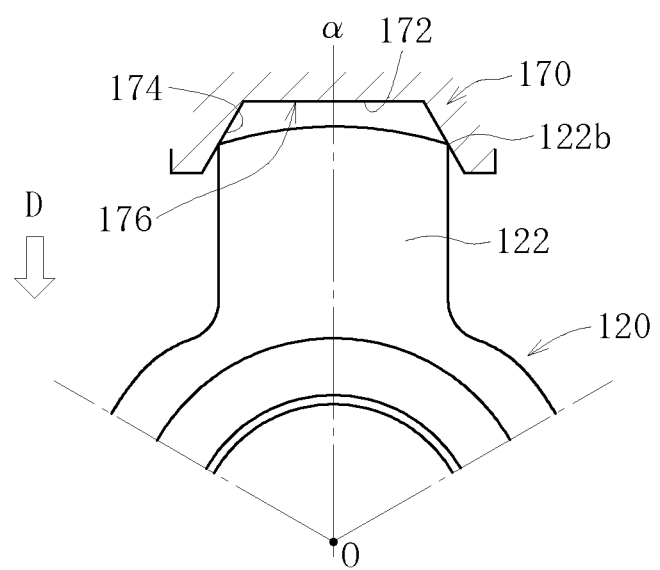
FIG. 14 A sectional view of a centering jig under a state of being held in contact with the journal, illustrating the forging step for the journal in the manufacturing method for the conventional tripod type constant velocity universal joint.

As a result of provision of the relief portion 62 with respect to the die 60 so as to avoid holding of a leading end portion of the raw-shaped material 52, the die 60 has the reduced number of points for holding the raw-shaped material 52 in comparison with that in conventional dies. Thus, load on the die 60 can be reduced, and hence a life of the die 60 can be prolonged. In addition, at the time of forging of the raw-shaped material 52, unlike in the conventional dies, it is unnecessary to strictly regulate forging conditions such as a size of the raw-shaped material and a setting condition of a forging machine in order to eliminate gaps p formed between an inner-wall corner portion 162 of a die 160 and a leading-end corner portion 152a of a raw-shaped material 152 (refer to FIG. 12). Thus, the raw-shaped material can be more easily forged.

As a result of forging for molding the outer peripheral surface 54 of the raw-shaped material 52 in conformity with the molding surface 64, the recessed round surfaces 61, the tapered surfaces 66, the projected round surfaces 63, and the relief surfaces 68 of the die 60, as illustrated in FIGS. 2A to 2C, on an outer peripheral surface 24 of the journal 22, there are formed projected round-corner portions 21 for reducing a lateral sectional area toward the leading end side, tapered straight portions 26 extending onto a leading end side of the projected round-corner portions 21, and recessed round-corner portions 23 positioned on a leading end side of the straight portions 26.

After the journal 22 is molded by forging in this way, the journal 22 undergoes centering. A centering jig 70 as illustrated in FIGS. 2A and 2B is used in a centering step for the journal 22. The centering jig 70 includes a recessed portion 76 formed of a flat top surface 72 and a tapered surface 74 expanding from the top surface 72 into the axial direction of the journal 22. Centering of the journal 22 is performed as follows: as illustrated in FIGS. 2A and 2B, the projected round-corner portions 21 of the journal 22 are brought into contact with the tapered surface 74 of the centering jig 70, and then a pressurizing force is applied to the centering jig 70 from a direction indicated by a hollow arrow in FIG. 2A.

The projected round-corner portions 21 of the journal 22 are parts molded by forging of the raw-shaped material 52 as described above under the state of being held in close contact with the recessed round surfaces 61 of the die 60, and hence each capable of serving as an edge portion as a centering reference at the time of the centering. When the projected round-corner portions 21, each of which is the edge portion as the centering reference, are brought into contact with the tapered surface 74 of the centering jig 70, the projected round-corner portions 21 of the journal 22 can be stably held into contact with the tapered surface 74 of the centering jig 70. As a result, centering of the journal 22 can be reliably performed.

At the time of the centering of the journal 22, the projected round-corner portions 21 of the journal 22 are brought into contact with the centering jig 70. In this context, as illustrated in FIG. 2C, the projected round-corner portions 21 are provided at the two points on the elliptical longitudinal side, and hence a contact state of the centering jig 70 with respect to the journal 22 can be stabilized. As a result, centering can be performed with higher accuracy.

As described above, when the journal 22 is forged with use of the die 60 provided with the relief portion 62 on a leading end side in such a manner that the projected round-corner portions 21 are formed on the outer peripheral surface 24 of the journal 22, the projected round-corner portions 21 of the journal 22 can be used as they are as the edge portions as the centering references in centering after forging. As a result, after forging, it is unnecessary to perform a conventional lathing step and a burr removing step which are performed for lathing a leading end portion and removing burrs of the same so as to form the centering reference. Thus, it is unnecessary to form the raw-shaped material 52 to be large in advance in consideration of a lathing amount. As a result, manufacturing man hours can be reduced without an increase in weight of the raw-shaped material 52, and manufacturing cost can be easily reduced.

Further, parts of the die, which mold the projected round-corner portions 21 to be used as the edge portions as the centering references, in other words, parts between the molding surface 64 and the tapered surfaces 66 of the die 60 are formed as the recessed round surfaces 61. In addition, parts of the die, which mold the recessed round-corner portions 23 formed on the leading end side of the projected round-corner portions 21, in other words, parts between the tapered surfaces 66 and the relief surfaces 68 are formed as the projected round surfaces 63. Thus, in comparison with a case where the parts between the molding surface 64 and the tapered surfaces 66 and the parts between the tapered surfaces 66 and the relief surfaces 68 are formed at right angles, at the time of forging, early abrasion of the die 60 owing to plastic flow of the raw-shaped material 52 at those parts can be suppressed. As a result, the life of the die 60 can be prolonged.

In the above-mentioned embodiment, the recessed round surfaces 61, the tapered surfaces 66, and the profected round surfaces 63 of the die 60 used at the time of forging are formed at the two points facing each other in the circumferential direction of the molding surface 64 of the die 60, in other words, the two points on the elliptical longitudinal side to be held in contact with the inner peripheral surface of the inner roller 34 after molding. After the forging, when centering is performed at the two points in the circumferential direction of the outer peripheral surface 24 of the journal 22, centering can be performed with higher accuracy. Note that, the projected round-corner portions 21 of the journal 22 are not necessarily provided at the two points facing each other in the circumferential direction, and may be provided over the entire periphery of the outer peripheral surface 24 of the journal 22. As long as centering with use of the centering jig 70 is possible, the recessed round surfaces 61, the tapered surfaces 66, and the projected round surfaces 63 of the die 60, in other words, the projected round-corner portions 21, the tapered surfaces 26, and the recessed round-corner portions 23 of the journal 22 are not particularly limited in position, size, shape, or the like.

Figure 3A:
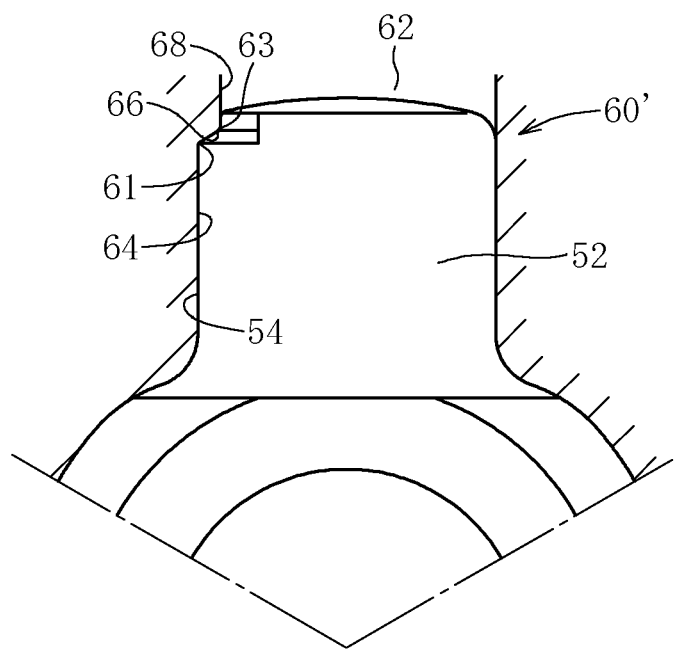
FIG. 3A A sectional view of a die under a state of holding the raw-shaped material, illustrating a forging step for a journal according to another embodiment of the present invention.
Figure 3B:
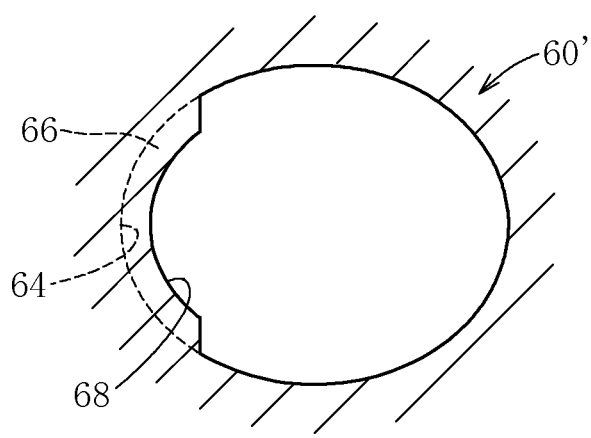
FIG. 3B A sectional view in which the die of FIG. 3A is viewed from above, illustrating the forging step for the journal according to the other embodiment of the present invention.
Figure 4A:
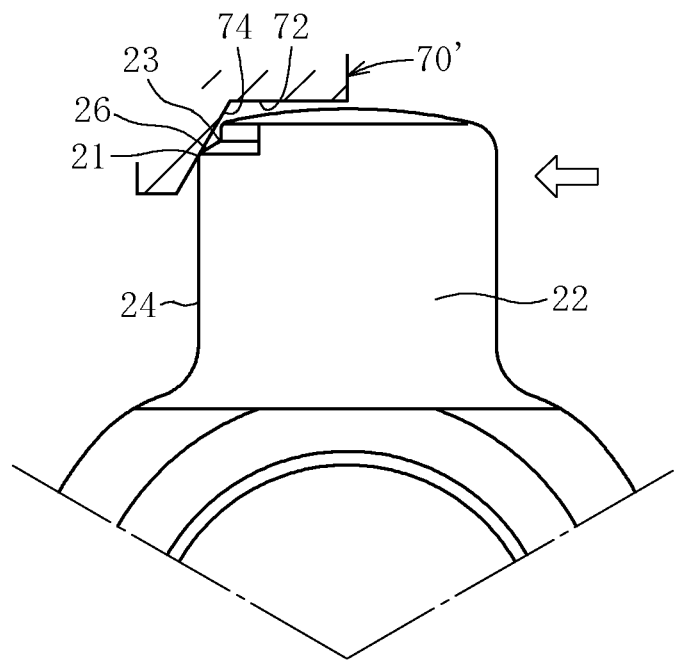
FIG. 4A A sectional view of a centering jig under a state of being held in contact with the journal, illustrating a centering forging step for the journal according to the other embodiment of the present invention.
Figure 4B:
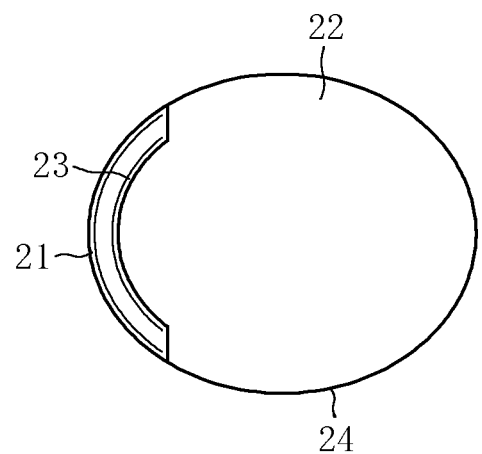
FIG. 4B A plan view in which the journal of FIG. 4A is viewed from above, illustrating the centering forging step for the journal according to the other embodiment of the present invention.

For example, as illustrated in FIGS. 3A and 3B, the recessed round surface 61, the tapered surface 66, and the projected round surface 63 may be formed at any one of the two points facing each other in the circumferential direction of the molding surface 64 of a die 60', in other words, any one of the two points on the elliptical longitudinal side to be held in contact with the inner peripheral surface of the inner roller 34 after molding. In this way, when the recessed round surface 61, the tapered surface 66, and the projected round surface 63 are formed at one point in the circumferential direction of the molding surface 64 of the die 60', as illustrated in FIGS. 4A and 4B, the projected round-corner portion 21, the tapered surface 26, and the recessed round-corner portion 23 are formed at one point in the circumferential direction of the outer peripheral surface 24 of the journal 22. In this case, as illustrated in FIG. 4A, the projected round-corner portion 21 of the journal 22 is brought into contact with the tapered surface 74 of a centering jig 70' so that centering can be performed with an elastic force of a spring applied as indicated by a hollow arrow in FIG. 4A. In this way, when centering is performed only at the one point in the circumferential direction of the outer peripheral surface 24 of the journal 22, centering can be easily performed.

Note that, in the above-mentioned embodiments, although the projected round-corner portion 21 and the recessed round-corner portion 23 are connected with the tapered surface 26, as long as the projected round-corner portion 21 can be formed as the edge portion as the centering reference on the outer peripheral surface 24 of the journal 22 after forging, the tapered surface 26 may be omitted and the projected round-corner portion 21 and the recessed round-corner portion 23 may be connected continuously to each other.

The present invention is not limited to the above-mentioned embodiments at all, and as a matter of course, can be carried out in other various modes without departing from the spirit of the present invention. The scope of the present invention is described in the scope of claims, and includes meaning of equivalents of elements described in the scope of claims and all changes in the scope of claims.

The invention claimed is:

1. A tripod type constant velocity universal joint comprising:
   an outer joint member having an inner peripheral surface provided with:
      three track grooves extending in an axial direction; and
      roller-guide surfaces extending in the axial direction on both sides of each of the three track grooves;
   a tripod member comprising three journals each projected into a radial direction; and
   a torque transmitting member supported rotatable around each of the three journals of the tripod member and inserted rollably in each of the three track grooves of the outer joint member,
   wherein, on an outer peripheral surface of each of the three journals, a projected round-corner portion for reducing a lateral sectional area toward a leading end side of each of the three journals is formed, and
   wherein, on the outer peripheral surface of each of the three journals, a tapered surface inclined with respect to an axial direction of each of the three journals is formed on a leading end side relative to the projected round-corner portion.

2. A tripod type constant velocity universal joint comprising:
   an outer joint member having an inner peripheral surface provided with:
      three track grooves extending in an axial direction; and
      roller-guide surfaces extending in the axial direction on both sides of each of the three track grooves;
   a tripod member comprising three journals each projected into a radial direction; and
   a torque transmitting member supported rotatably around each of the three journals of the tripod member and inserted rollably in each of the three track grooves of the outer joint member,
   wherein, on an outer peripheral surface of each of the three journals, a projected round-corner portion for reducing a lateral sectional area toward a leading end side of each of the three journals is formed, and
   wherein the projected round-corner portion is provided at one point in a circumferential direction of the outer peripheral surface of each of the three journals.

3. A tripod type constant velocity universal joint comprising:
   an outer joint member having an inner peripheral surface provided with:
      three track grooves extending in an axial direction; and
      roller-guide surfaces extending in the axial direction on both sides of each of the three track grooves;
   a tripod member comprising three journals each projected into a radial direction; and
   a torque transmitting member supported rotatably around each of the three journals of the tripod member and inserted rollably in each of the three track grooves of the outer joint member, wherein, on an outer peripheral surface of each of the three journals, a projected round-corner portion for reducing a lateral sectional area toward a leading end side of each of the three journals is formed, and wherein the projected round-corner portion comprises two projected round-corner portions provided at two points facing each other in a circumferential direction of the outer peripheral surface of each of the three journals.

4. A tripod type constant velocity universal joint comprising:

an outer joint member having an inner peripheral surface provided with:
three track grooves extending in an axial direction; and
roller-guide surfaces extending in the axial direction on both sides of each of the three track grooves;

a tripod member comprising three journals each projected into a radial direction; and a torque transmitting member supported rotatably around each of the three journals of the tripod member and inserted rollably in each of the three track grooves of the outer joint member, wherein, on an outer peripheral surface of each of the three journals, a projected round-corner portion for reducing a lateral sectional area toward a leading end side of each of the three journals is formed, and wherein, on the outer peripheral surface of each of the three journals, a recessed round-corner portion is formed on the leading end side relative to the projected round-corner portion.

5. A tripod type constant velocity universal joint comprising:

an outer joint member having an inner peripheral surface provided with:
three track grooves extending in an axial direction; and
roller-guide surfaces extending in the axial direction on both sides of each of the three track grooves;

a tripod member comprising three journals each projected into a radial direction; and a torque transmitting member supported rotatably around each of the three journals of the tripod member and inserted rollably in each of the three track grooves of the outer joint member, wherein, on an outer peripheral surface of each of the three journals, a projected round-corner portion for reducing a lateral sectional area toward a leading end side of each of the three journals is formed, wherein each of the torque transmitting members comprises:
an outer roller inserted in a corresponding one of the three track grooves of the outer joint member; and
an inner roller externally fitted to a corresponding one of the three journals and arranged on an inner peripheral side of the outer roller, wherein an inner peripheral surface of each of the inner rollers has a convex circular-arc shape, wherein each of the three journals has a straight shape orthogonal to an axial line of the tripod type constant velocity universal joint in vertical cross-section, and is held in contact with the inner peripheral surface of the corresponding inner roller in a direction orthogonal to the axial line of the tripod type constant velocity universal joint in lateral cross-section, and wherein a gap is formed between each of the three journals and the inner peripheral surface of the corresponding inner roller in an axial-line direction of the tripod type constant velocity universal joint.

6. A tripod type constant velocity universal joint comprising:

an outer joint member having an inner peripheral surface provided with:
three track grooves extending in an axial direction; and
roller-guide surfaces extending in the axial direction on both sides of each of the three track grooves;

a tripod member comprising three journals each projected into a radial direction; and a torque transmitting member supported rotatable around each of the three journals of the tripod member and inserted rollably in each of the three track grooves of the outer joint member, wherein, on an outer peripheral surface of each of the three journals, a projected round-corner portion for reducing a lateral sectional area toward a leading end side of each of the three journals is formed, wherein a lateral cross-section of each of the three journals has an elliptical shape, and wherein the projected round-corner portion of each of the three journals is arranged on a substantially-elliptical longitudinal side.

7. A manufacturing method for a tripod type constant velocity universal joint comprising:

an outer joint member having an inner peripheral surface provided with:
three track grooves extending in an axial direction; and
roller-guide surfaces extending in the axial direction on both sides of each of the three track grooves;

a tripod member comprising three journals each projected into a radial direction; and a torque transmitting member supported rotatably around each of the three journals of the tripod member and inserted rollably in each of the three track grooves of the outer joint member, the manufacturing method comprising, when forging a raw-shaped material corresponding to each of the three journals into a journal shape with use of a molding surface of a die, under a state in which a relief portion is provided on a raw-shaped-material-leading-end-side of the die, molding an outer peripheral surface of the raw-shaped material into a projected round shape with use of a narrowing surface formed on the molding surface with which the outer peripheral surface of the raw-shaped material is held in contact and a recessed round surface formed between the molding surface and the narrowing surface.

8. A manufacturing method for a tripod type constant velocity universal joint according to claim 7, wherein the molding surface of the die comprises a surface parallel to an axial direction of each of the three journals, and wherein the narrowing surface of the die comprises a tapered surface inclined with respect to the axial direction of each of the three journals.

9. A manufacturing method for a tripod type constant velocity universal joint according to claim 8, wherein the recessed round surface is provided at one point in a circumferential direction of the molding surface of the die.

10. A manufacturing method for a tripod type constant velocity universal joint according to claim 9, further comprising molding the outer peripheral surface of the raw-shaped material into a recessed round shape with use of a projected round surface formed between the narrowing surface and a relief surface of the relief portion provided on a leading end side of the narrowing surface.

11. A manufacturing method for a tripod type constant velocity universal joint according to claim 8, wherein the recessed round surface comprises two recessed round surfaces provided at two points facing each other in a circumferential direction of the molding surface of the die.

12. A manufacturing method for a tripod type constant velocity universal joint according to claim 8, further comprising molding the outer peripheral surface of the raw-shaped material into a recessed round shape with use of a projected round surface formed between the narrowing surface and a relief surface of the relief portion provided on a leading end side of the narrowing surface.

13. A manufacturing method for a tripod type constant velocity universal joint according to claim 7, wherein the recessed round surface is provided at one point in a circumferential direction of the molding surface of the die.

14. A manufacturing method for a tripod type constant velocity universal joint according to claim 13, further comprising molding the outer peripheral surface of the raw-shaped material into a recessed round shape with use of a projected round surface formed between the narrowing surface and a relief surface of the relief portion provided on a leading end side of the narrowing surface.

15. A manufacturing method for a tripod type constant velocity universal joint according to claim 7, wherein the recessed round surface comprises two recessed round surfaces provided at two points facing each other in a circumferential direction of the molding surface of the die.

16. A manufacturing method for a tripod type constant velocity universal joint according to claim 15, further comprising molding the outer peripheral surface of the raw-shaped material into a recessed round shape with use of a projected round surface formed between the narrowing surface and a relief surface of the relief portion provided on a leading end side of the narrowing surface.

17. A manufacturing method for a tripod type constant velocity universal joint according to claim 7, further comprising molding the outer peripheral surface of the raw-shaped material into a recessed round shape with use of a projected round surface formed between the narrowing surface and a relief surface of the relief portion provided on a leading end side of the narrowing surface.

18. A manufacturing method for a tripod type constant velocity universal joint according to claim 7,
wherein each of the torque transmitting members comprises:
an outer roller inserted in a corresponding one of the three track grooves of the outer joint member; and
an inner roller externally fitted to a corresponding one of the three journals and arranged on an inner peripheral side of the outer roller,
wherein an inner peripheral surface of each of the inner rollers has a convex circular-arc shape,
wherein each of the three journals has a straight shape orthogonal to an axial line of the tripod type constant velocity universal joint in vertical cross-section, and is held in contact with the inner peripheral surface of the corresponding inner roller in a direction orthogonal to the axial line of the tripod type constant velocity universal joint in lateral cross-section, and
wherein a gap is formed between each of the three journals and the inner peripheral surface of the corresponding inner roller in an axial-line direction of the tripod type constant velocity universal joint.

19. A manufacturing method for a tripod type constant velocity universal joint according to claim 7,
wherein a lateral cross-section of the molding surface of the die has an elliptical shape, and
wherein the recessed round surface is arranged on a substantially-elliptical longitudinal side.

* * * * *